United States Patent
Lu et al.

(10) Patent No.: US 8,434,032 B2
(45) Date of Patent: Apr. 30, 2013

(54) METHOD OF GENERATING AN INTELLECTUAL PROPERTY BLOCK DESIGN KIT, METHOD OF GENERATING AN INTEGRATED CIRCUIT DESIGN, AND SIMULATION SYSTEM FOR THE INTEGRATED CIRCUIT DESIGN

(75) Inventors: Lee-Chung Lu, Taipei (TW); Yun-Han Lee, Baoshan Township (TW); Wei-Li Chen, Zhubei (TW); Tan-Li Chou, Zhubie (TW); Kheng-Guan Tan, Zhubei (TW); Shi-Hung Wang, Houli Township (TW)

(73) Assignee: Taiwan Semiconductor Maufacturing Company, Ltd. (TW)

( * ) Notice: Subject to any disclaimer, the term of this patent is extended or adjusted under 35 U.S.C. 154(b) by 188 days.

(21) Appl. No.: 12/950,371

(22) Filed: Nov. 19, 2010

(65) Prior Publication Data

US 2012/0131523 A1    May 24, 2012

(51) Int. Cl.
*G06F 17/50*    (2006.01)
(52) U.S. Cl.
USPC ............... 716/55; 716/101; 716/104; 703/14

(58) Field of Classification Search .................. 716/55, 716/101, 104
See application file for complete search history.

(56) References Cited

U.S. PATENT DOCUMENTS 7,890,900 B2 *    2/2011    Aleksanyan et al. ......... 716/110

* cited by examiner

*Primary Examiner* — Thuan Do
(74) *Attorney, Agent, or Firm* — Lowe Hauptman Ham & Berner, LLP (57) ABSTRACT

The present application discloses a method of generating an intellectual property (IP) block design kit including an IP block circuit design and a system-level characteristics table for manufacturing an integrated circuit. According at least one embodiment, the IP block circuit design is generated. The IP block circuit design is simulated based on predetermined configuration sets, and each configuration set has manufacturing options and/or operating conditions. A plurality of system-level models for the predetermined configuration sets are generated based on the simulation of the IP block circuit design. The system-level characteristics table is generated by arranging the predetermined configuration sets and the system-level models in compliance with a system-level characteristics table template of a system-level characteristics modeling device. Then the IP block circuit design and the system-level characteristics table are stored as the IP block design kit.

20 Claims, 7 Drawing Sheets

| BLOCK CPU COMMON ATTRIBUTES | | 362 | 364 | 366 | 368 |
| --- | --- | --- | --- | --- | --- |
| PROCESS | 65G | 65LP | 40G | 40LP |
| VOLTAGE | 1.2 | 1.1 | 1.1 | 1.0 |
| TEMPERATURE | 85C | 85C | 85C | 85C |
| THRESHOLD | SVT | SVT | SVT | SVT |
| METAL SCHEME | 7 LAYERS | 7 LAYERS | 7 LAYERS | 7 LAYERS |
| SUB-BLOCK CPU::CORE COMMON ATTRIBUTES | | | | |
| DESIGN_TYPE | RANDOM LOGIC | | | |
| LIBRARY_HEIGHT | 12 TRACKS (T) | | | |
| STATE CPU::CORE::ACTIVE COMMON ATTRIBUTES | | | | |
| FREQUENCY | 900MHz | 700MHz | 1GHz | 800MHz |
| DYNAMIC POWER | 210mW | 154mW | 111mW | 84mW |
| LEAKAGE POWER | 10mW | 1mW | 5mW | 0.5mW |
| STATE CPU::CORE::SLEEP COMMON ATTRIBUTES | | | | |
| FREQUENCY | 0MHz | 0MHz | 0MHz | 0MHz |
| DYNAMIC POWER | 0mW | 0mW | 0mW | 0mW |
| LEAKAGE POWER | 10mW | 1mW | 5mW | 0.5mW |
| STATE CPU::CORE::SHUT_DOWN COMMON ATTRIBUTES | | | | |
| FREQUENCY | 0MHz | 0MHz | 0MHz | 0MHz |
| DYNAMIC POWER | 0mW | 0mW | 0mW | 0mW |
| LEAKAGE POWER | 0mW | 0mW | 0mW | 0mW |
| SUB-BLOCK CPU::CACHE COMMON ATTRIBUTES | | | | |
| DESIGN_TYPE | RF/SRAM | | | |
| STATE CPU::CACHE::ACTIVE COMMON ATTRIBUTES | | | | |
| FREQUENCY | 900MHz | 700MHz | 1GHz | 800MHz |
| DYNAMIC POWER | 90mW | 66mW | 49mW | 36mW |
| LEAKAGE POWER | 0.9mW | 0.5mW | 0.5mW | 0.3mW |
| STATE CPU::CACHE::SLEEP COMMON ATTRIBUTES | | | | |
| FREQUENCY | 0MHz | 0MHz | 0MHz | 0MHz |
| DYNAMIC POWER | 0mW | 0mW | 0mW | 0mW |
| LEAKAGE POWER | 0.9mW | 0.5mW | 0.5mW | 0.3mW |
| STATE CPU::CACHE::SHUT_DOWN COMMON ATTRIBUTES | | | | |
| FREQUENCY | 0MHz | 0MHz | 0MHz | 0MHz |
| DYNAMIC POWER | 0mW | 0mW | 0mW | 0mW |
| LEAKAGE POWER | 0mW | 0mW | 0mW | 0mW |

METHOD OF GENERATING AN INTELLECTUAL PROPERTY BLOCK DESIGN KIT, METHOD OF GENERATING AN INTEGRATED CIRCUIT DESIGN, AND SIMULATION SYSTEM FOR THE INTEGRATED CIRCUIT DESIGN

BACKGROUND

In conventional integrated circuit (IC) designs using a circuit-level approach, designers place electrical components such as field-effect transistors (FETs), diodes, resistors, capacitors, or other active or passive components on a layout and arrange interconnections therebetween.

However, as the number of components in an IC increases, a circuit design approach that allows an IC designer to focus on a higher abstract view of the circuit rather than the circuit-level approach helps the IC designer to more efficiently design a particular IC. For example, an IC designer uses a hardware description language (such as VERILOG or VHDL) or a programming language (such as C language or MATLAB Language) to describe the functionality and input/output terminals of the IC. Subsequently, a synthesizer converts the IC design generated using the hardware description language or the programming language into a circuit netlist, and a layout tool converts the circuit netlist into a layout for forming the IC.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
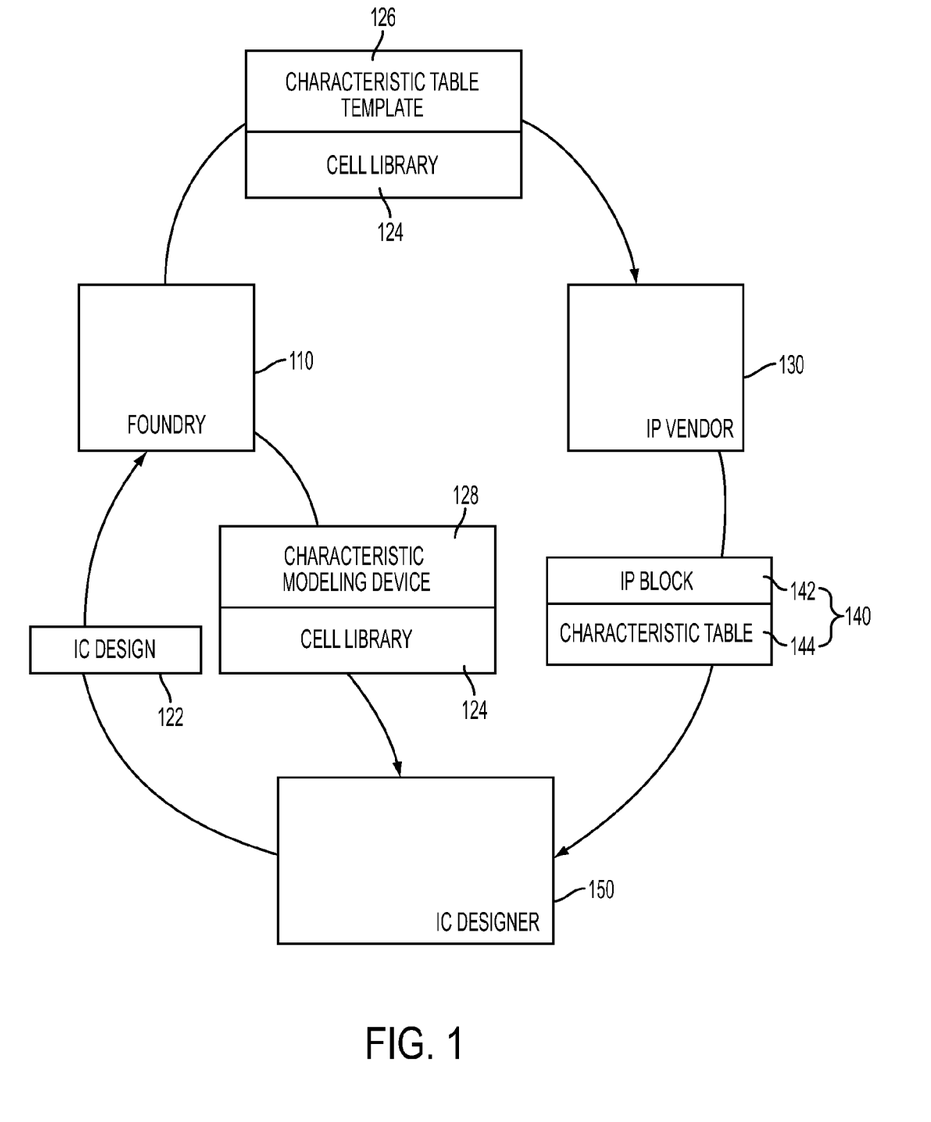
FIG. 1 is a high-level block diagram of interactions between an integrated circuit (IC) foundry, an intellectual property (IP) block vendor, and an IC designer according to an embodiment.

FIG. 1 is a high-level block diagram of interactions between an integrated circuit (IC) foundry 110, an intellectual property (IP) block vendor 130, and an IC designer 150 according to an embodiment. As the complexity of an IC increases, IC designers 150 adopt a system-level approach that allows IC designers 150 to focus on the system-level functionality of an IC and reuse existing circuit templates or circuit blocks in the IC design. This system-level approach is helpful for designing a complicated IC chip such as a processor or a System-on-a-chip (SoC) IC.

Usually, the reusable circuit blocks are obtained from at least two sources: circuit blocks designed by the IC designer 150 and circuit blocks provided by an IP vendor 130. IP vendor 130 refers to an entity dedicated to developing reliable and reusable circuit blocks for IC designers 150. These reusable circuit blocks, particularly ones that are prepared by the IP vendor 130, are sometimes known as IP blocks 142.

IP blocks 142 include, but are not limited to, embedded processors including processor cores, digital signal processing (DSP) cores, embedded graphical processing units (GPUs), interfaces such as USB controllers, ETHERNET, PCI-E, WIFI, WIMAX, or BLUETOOTH, peripherals such as UART or power management blocks, or memory modules and/or controllers.

The IC foundry 110 receives IC designs 122 from IC designer 150 and manufactures IC chips based on the IC designs 122. The submission of the IC circuit design by IC designer 150 to the IC foundry is also known as tape-out. Further, in order to allow IP vendor 130 and IC designer 150 to simulate and verify circuit designs before the circuit designs are actually relied upon to manufacture IC chips, IC foundry 110 also provides one or more cell libraries 124 to the IP vendor 130 and/or the IC designer 150. In some embodiments, the cell libraries 124 are manufacturing process specific, and the IC foundry 110 provides cell libraries 124 corresponding to one or more manufacturing processes that the IC vendor 130 and/or the IC designer 150 intend to use to manufacture IC chips based on IC designs 122.

Also, the IC foundry 110 provides a system-level characteristics table template 126 of a system-level characteristics modeling device 128 to the IP vendor 130. The system-level characteristics table template 126 is a template for forming a system-level characteristics table 144 usable in conjunction with the system-level characteristics modeling device 128 corresponding to an IP block 142 generated by IP vendor 130. The system-level characteristics modeling device 128 will be described in further detail later. The system-level characteristics table template 126 comprises a plurality of attributes regarding manufacturing options and/or operating conditions. The attributes include, but are not limited to, process technology, supply voltages, temperatures, threshold voltages, standard cell libraries, memory compilers and memory designs, metal schemes, operating frequency, and/or other manufacturing options or operating conditions.

The system-level characteristics table 144, when completed, comprises a plurality of predetermined configuration sets and a plurality of system-level models corresponding to predetermined configuration sets. Each configuration set has manufacturing options and/or operating conditions. A system-level model refers to one or more values or information regarding power consumption, die area, operating frequency, or other parameters usable as an approximation of the IC block under the circumstance specified by the predetermined configuration sets when performing a system-level simulation. Compared with a circuit-level simulation, a system-level simulation is usable to test and verify an IC design in a shorter time with less computation resource.

In accordance with an embodiment, the system-level characteristics table template 126 further comprises suggested predetermined configuration sets that are usable to generate characteristics models by the system-level characteristics modeling device 128 provided by IC foundry 110. The predetermined configuration sets are a subset of all possible configurations of the attributes (manufacturing options and/or operating conditions) for an IP block circuit design, and the system-level models corresponding to the predetermined configuration sets are the sample system-level models of the IP block circuit design usable to derive a system-level model of any set of configuration selected by the IC designer 150.

After IP vendor 130 generates an IP block circuit design 142, the IP vendor 130 generates a system-level characteristics table 144 for the IP block circuit design 142 according to the system-level characteristics table template 126. The process of generating the system-level characteristics table 144 is sometimes known as a characterization process which includes simulating the IP block circuit design 142 and generating system-level models based on the simulation of the IP block circuit design 142.

The IP vendor 130 provides an IP block design kit 140 including the IP block circuit design 142 and the corresponding system-level characteristics table 144 to IC designer 150. Further, in some embodiments, the IP vendor 130 alters the suggested predetermined configuration sets and/or attributes based on the requests from IC designer 150 or for facilitating the calculation of a more accurate system-level characteristics model.

The IC foundry 110 provides IP vendor 130 the system-level characteristics modeling device 128 configured to generate a system-level model based on a set of configuration of manufacturing option and/or operating conditions by using system-level characteristics model table 144. Through the usage of the IC block design kit 140 from the IP vendor 130 and the system-level characteristics modeling device 128 and cell libraries 124 from the IC foundry 110, IC designer 150 is able to derive system-level models specific to a set of configuration selected by the IC designer 150, even if the selected combination of manufacturing options and/or operating conditions is not consistent with one or more of the predetermined configuration sets.

In some embodiments, the IC foundry 110 and/or the IP vendor 130 uses the predetermined configuration sets to maximize the accuracy of the system-level model generated by the system-level characteristics modeling device 128 used by the IC designer 150.

Although the IC foundry 110, the IP block vendor 130, and the IC designer 150 are depicted as three separate entities in FIG. 1, in some embodiments, a single entity has a role including a combination of at least portions of two or three of the IC foundry 110, the IP block vendor 130, or the IC designer 150. A person of ordinary skill in the art will appreciate that the term "entity" is used to refer to a person, a team, a department, or a company.

Figure 2:
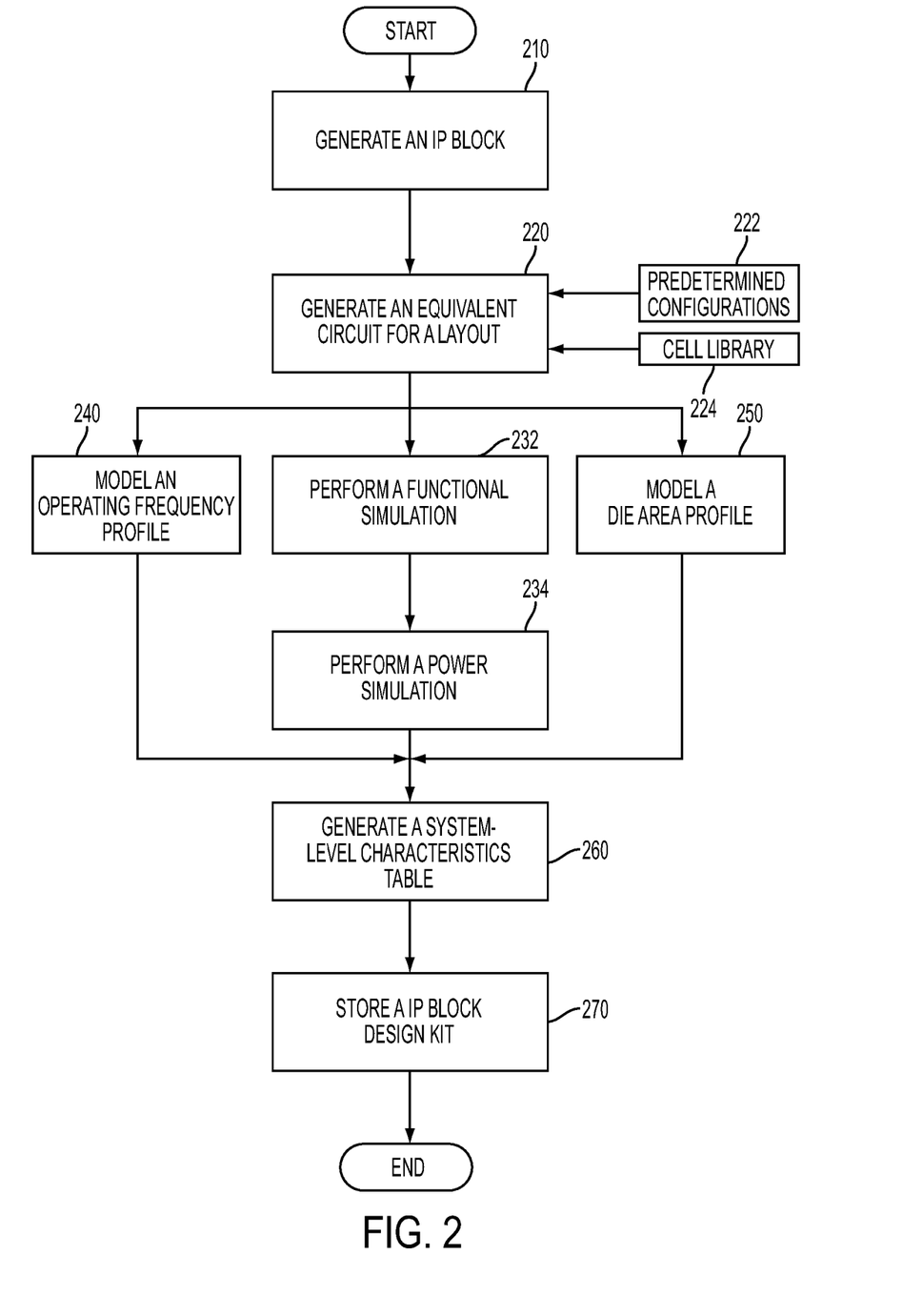
FIG. 2 is a flow chart of a method of generating an IP block design kit according to an embodiment.

FIG. 2 is a flow chart of a method of generating an IP block design kit by the IP vendor 130 (FIG. 1) according to an embodiment. It is understood that, in some embodiments, additional operations are performed before, during, and/or after the method of FIG. 2.

In operation 210, the IP vendor 130 generates an IP block circuit design 142. In some embodiments, the IP block circuit design 142 is described using a hardware description language in a Register-Transfer Level (RTL) style or in a Gate Level (GL) style. In some embodiments, the IP block circuit design 142 is described using a programming language in an RTL style, a GL style, or an electronic system Level (ESL) style. In at least one embodiment, the IP block circuit design 142 includes one or more sub-blocks, i.e., other IP blocks or reusable circuit blocks. In some embodiments, the method of FIG. 2 is applied to the sub-blocks recursively.

Subsequently, in operations 220-250, the IP vendor 130 further analyzes the IP block circuit design 142 according to a cell library 224 provided by an IC foundry 110 and a plurality of predetermined configuration sets 222 of manufacturing options and/or operating conditions. As such, a plurality of system-level models corresponding to the predetermined configuration sets 222 is obtained. Operations 220-250 are sometimes known as characterization of the IP block circuit design 142.

The predetermined configuration sets 222 of the manufacturing options and/or operating conditions are selected by the IP vendor 130 based on the system-level characteristics table template 126 provided by the IC foundry 110. In some embodiments, the IP vendor 130 adds or removes one more attributes and/or predetermined configuration sets 222 responsive to a request from the IC Designer 150 or in order to more accurately model the IP block circuit design 142. In some embodiments, factors to consider in selecting the predetermined configuration sets are accuracy in calculating the power of other configurations, effort and complexity in calculating the power of other configurations given the same accuracy desired, or characterization effort of the predetermined configuration sets. For example, in at least one embodiment, there is at least one configuration set corresponding to each process node and threshold voltage. This is because different process nodes may have quite different power, performance, and area characteristics, and thus having at least one configuration set for each process node reduces complexity and efforts to model the differences in order to achieve a predetermined accuracy. For example, in some embodiments, the more predetermined configuration sets are available, the less difference it is between a simulation configuration set and at least one of the predetermined configuration sets.

In operation 220, IP vendor 130 generates one or more equivalent circuits for the predetermined configuration sets. The equivalent circuits are configured to approximate parasitic effects of at least a layout according to the IP block circuit design 142, one of the predetermined configuration sets, and cell libraries associated with the one of the predetermined configuration sets. In some embodiments, the equivalent circuits are generated using a hardware description language. In some embodiments, the equivalent circuits are generated using the same language and in the same style as the IP block circuit design 142. The IP block circuit design 142 and the equivalent circuits are used in subsequent operations to form system-level models including models for power consumption levels, operating frequencies, and/or die areas of the IP block circuit design 142.

The generation of a plurality of system-level models for the predetermined configuration sets for the IP block circuit design 142 includes generating a power profile model of the IP block circuit design 142. In operation 232, IP vendor 130 performs a functional simulation of the IP block circuit design 142 to define at least a power event based on waveform information. Each power event refers to an operating state or a specific circuit operation of the IP block circuit design 142 or the IP block circuit design 142 in conjunction with the equivalent circuits. For example, in some embodiments, the operating state includes an active state, a sleep state, or a shut-down state. In some embodiments, the specific circuit operation includes a cache write hit, a cache write miss, or a buffered read. In some other embodiments, the specific circuit operations correspond to a combination of instruction execution and performance indicator states.

In operation 234, the IP vendor 130 performs a power simulation of the IP block circuit design 142, based on the at least one predetermined power event, for each one of the anchor configurations. The estimated power consumption values for the predetermined power events are calculated from the simulation result of operation 232, and the power events and corresponding estimated power consumption values are stored as a power consumption profile model. In some embodiments, the waveform information from operation 234 is associated with timing information, and the power simulation result is also associated with timing information. The calculation of the values for a specific power event is performed by identifying the timing information for a specific power event, and then converting the power information to the power consumption value for the specific power event based on the timing information.

In some embodiments, the performance of the functional simulation (operation 232) comprises recursively simulating sub-blocks of the IP block circuit design 142, and the performance of the power simulation comprises recursively calculating the power consumption value based on separate power profile models of the sub-blocks. In some embodiments, operations 232 and 234 are performed cyclically in order to determine the power profile models for the sub-blocks, and then the power profile model of the IP block circuit design 142 as a whole.

In addition, in some embodiments, operations 232-234 are performed again if, after performing operation 232-234 once, the IP vendor further divides the power events and/or the predetermined configuration sets into more fine grained power events and/or configurations of manufacturing options and/or operating conditions.

The generation of a plurality of system-level models for the predetermined configuration sets for the IP block circuit design 142 includes generating an operating frequency profile model of the IP block circuit design 142. In operation 240, IP vendor 130 selects a predetermined number of circuit paths as an operating frequency. For example, in a digital circuit design that is partitioned into three categories: standard cells, memory, and custom circuits, critical sections of each category are selected because the performance of these critical sections varies more significantly than other sections for different configuration sets. In at least one embodiment, an embedded processor includes standard cells and memory cells, and timing paths of the processor are categorized into: (1) all standard cells only; (2) mixed cells including standard cells and memory; and/or (3) memory cells only. A predetermined number (such as ten) of most timing critical paths from each category are selected.

The generation of a plurality of system-level models for the predetermined configuration sets for the IP block circuit design 142 includes generating a die area profile model of the IP block circuit design 142. In operation 250, in at least one embodiment, IP vendor 130 converts the IP block circuit design 142 into an equivalent NAND gate count as a die area profile model. In some embodiments, even better accuracy may be obtained by two approaches: (1) better and more detailed modeling; or (2) fast prototyping.

Regarding better and more detailed modeling, in some embodiment, circuits are categorized into (1) Standard cells; (2) Memory cells; and/or (3) Custom circuits. For each category, different methods of representations may be used. For standard cells, in some embodiments, finer categories are created and each cell is put in a category. The sum of die area of all the cells in a category is computed. These (category, die area) pairs form a profile for the standard cells. For example, different categories include one or more of NAND gates, NOR gates, Complex gates, Mux gates, Flip-flop registers, buffers; or inverters. For Memory cells, different memory sizes, structures and architectures form different categories. For Custom circuits, further categorization is performed, and the details of applied categories will depend on the type of circuits.

Another method to achieve better accuracy is to perform fast prototyping. By using fast synthesis (from RTL to standard cells, memory cells), fast physical place and route algorithms on the predetermined configuration sets first. Then for a selected simulation configuration set by IC designer, the fast prototyping flow is applied again and the area information is extracted and can be further refined by comparing the result of selected configuration set with those of the predetermined sets.

Although a power consumption profile model, an operating frequency profile model, and a die area profile model are generated according to the embodiment of FIG. 2, in some embodiments, a greater or fewer number of types of system-level model regarding the IP block circuit design 142 is generated.

Further, in operation 260, the IP vendor generates a system-level characteristics table 144 in compliance with a system-level characteristics table template 126 of a system-level characteristics modeling device by arranging the predetermined sets of conditions and the system-level models including the power consumption profile model, the operating frequency profile model, and/or the die area profile model. In some embodiments, additional information not required by the system-level characterization table template is discarded when forming the system-level characteristics table 144. In some other embodiments, the additional information from the simulation of the IP block design is added to the system-level characteristics table 144 by creating additional fields of attributes and storing the additional information with the created attributes the information pertains.

Then, in operation 270, IP vendor 130 stores the IP block circuit design 142 and the system-level characteristics table 144 as an IP block design kit 140 for distribution to IC designers 150.

Figure 3A:
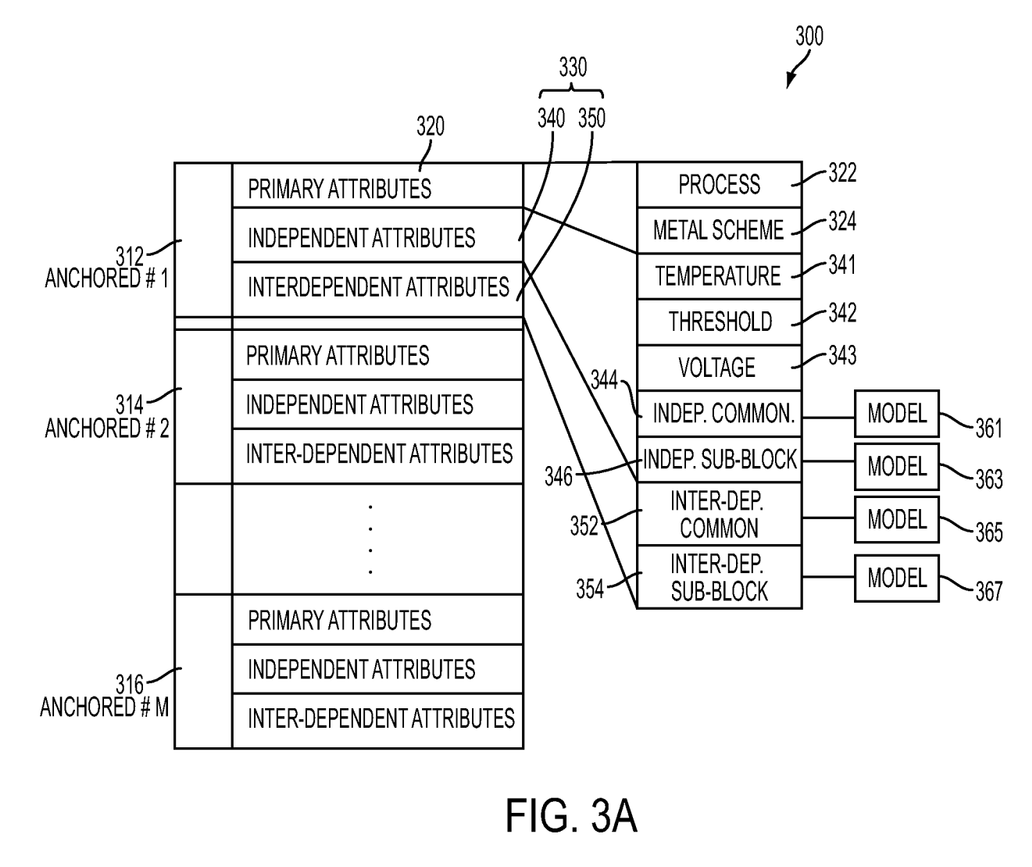
FIG. 3A is a diagram of a system-level characteristics table according to an embodiment.

FIG. 3A is a diagram of a system-level characteristics table 300 according to an embodiment. The system-level characteristics table 300 includes information associated with a plurality of predetermined configuration sets, such as block 312 for a first predetermined set of configuration, block 314 for a second predetermined set of configuration, and block 316 for an M-th predetermined set of configuration, where M is a positive integer. For each predetermined set of configuration 312/314/316, the system-level characteristics table 300 includes information or values regarding manufacturing options and/or operating conditions that are categorized into primary attributes 320 and non-primary attributes 330.

Primary attributes 320 refer to manufacturing options and/or operating conditions that the system-level characteristics modeling device is not applicable for deriving a system-level model for a simulation configuration from system-level models of predetermined configuration sets s that are have different settings regarding the primary attributes 320. For example, primary attributes 320 includes information regarding the manufacturing process node 322 and/or the metal scheme 324 (i.e., the number of metal layers).

Non-primary attributes 330 refer to manufacturing options and/or operating conditions that the system-level characteristics modeling device is applicable for deriving a system-level model for a simulation configuration from system-level models of predetermined configuration sets s. Non-primary attributes 330 are further categorized into independent attributes 340 and/or inter-dependent attributes 350.

An independent attribute is defined as a single one of the manufacturing options and/or the operating conditions that the system-level characteristics modeling device relies upon to calculate a system-level model for the simulation configuration using the system-level characteristics table. In other words, the calculation of the system-level model is performed without considering other attributes. For example, independent attributes 340 includes information regarding operating temperature 341, threshold voltage of a standard transistor component 342, operating power level 343, other independent attributes related to power consumption, operating frequency, or die sizes 344, and/or other independent attributes related to power consumption values, operating frequencies, or die sizes of a sub-block of the IP block 346.

An inter-dependent attribute is defined as two or more of the manufacturing options and/or the operating conditions that the system-level characteristics modeling device relies upon to calculate a system-level model for the simulation configuration using the system-level characteristics table. In other words, the calculation is performed by considering two or more attributes simultaneously. For example, inter-dependent attributes 350 includes information regarding inter-dependent independent attributes related to power consumption, operating frequency, or die sizes 352, and/or other inter-dependent attributes related to power consumption values, operating frequencies, or die sizes of a sub-block of the IP block 354.

Further, the system-level characteristics table 300 includes information regarding system-level models (indicated by fields 361/363/365/367) associated with various predetermined configuration sets. Different fields of a system-level model 361/363/365/367 for each predetermined set of configuration are organized to be closely positioned with the attribute that the field of system-level model is most relevant. In some embodiments, the fields of a system-level model 361/363/365/367 are collectively arranged in a portion separate from the attributes that are most relevant to the fields 361/363/365/367.

Figure 3B:
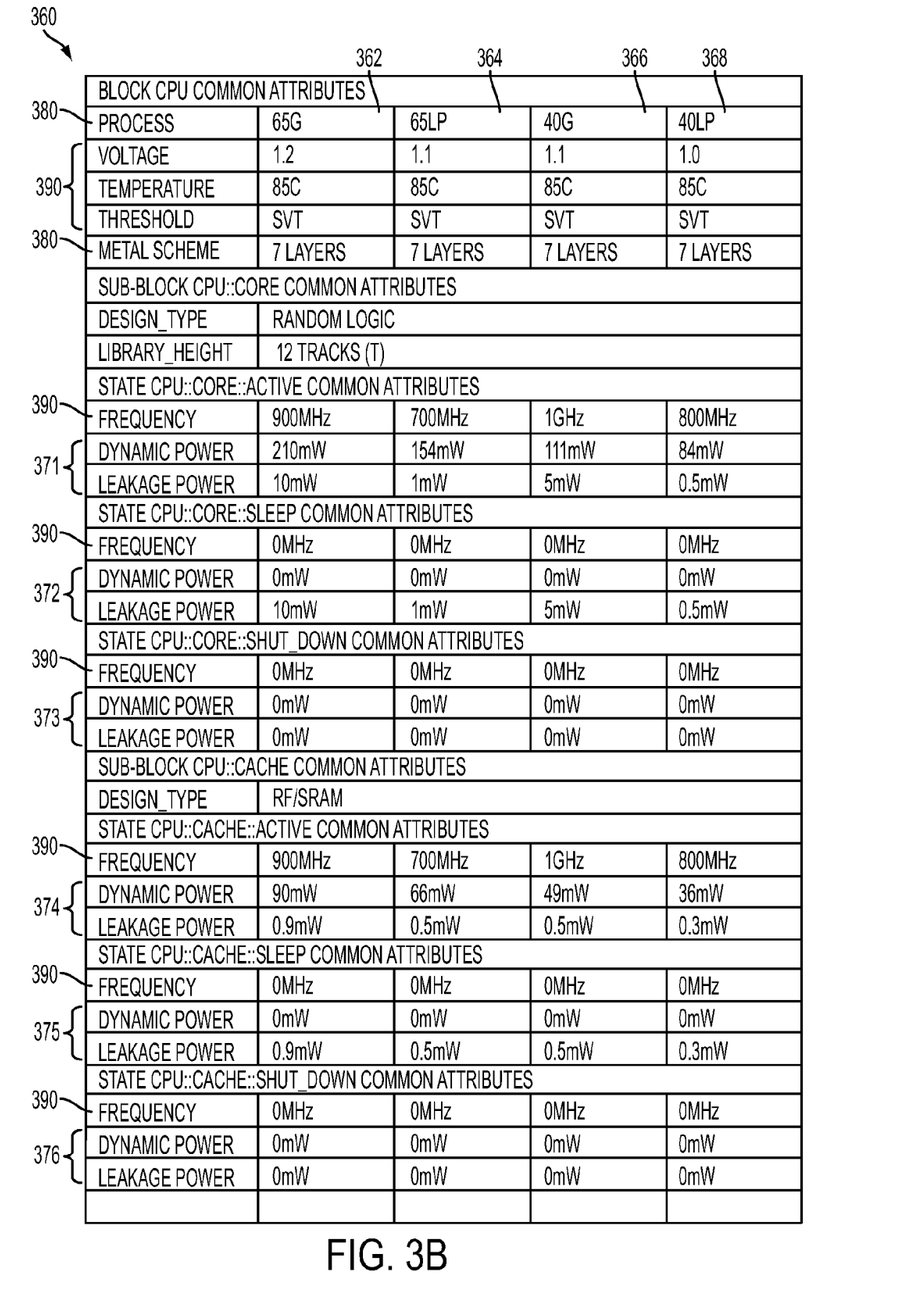
FIG. 3B is an example of a portion of a system-level characteristics table according to an embodiment.

FIG. 3B is an example of a portion of a system-level characteristics table 360 according to an embodiment. Four columns 362/364/366/368 of information, each related to a predetermined set of configuration and fields of a power consumption profile model (rows 371-376) associated with a corresponding predetermined set of configuration, are shown in the table 360. In some embodiment, the power values are replaced with functions of other parameters like circuit switching activities or some other performance indicators. These functions or indicators reduce the number of columns and/or rows of FIG. 3B without scarifying accuracy of modeling. Therefore, table of values can be replaced with table of functions and/or parameters. For example, one of the power values can be a linear function of switching activity of all the inputs to the circuit. Primary attributes (indicated by rows 380) include the process node and the metal scheme. Non-primary attributes (indicated by rows 390) include operating temperature, threshold voltage of a standard transistor component, operating power level, and operating frequencies under a plurality of power events. The information and values regarding die area modeling and operating frequency modeling are omitted.

Although only four predetermined configuration sets 362/364/366/368 are listed in the FIG. 3B, a person of ordinary skill in the art will appreciate that there are greater or fewer numbers of predetermined configuration sets in some embodiments.

Figure 4:
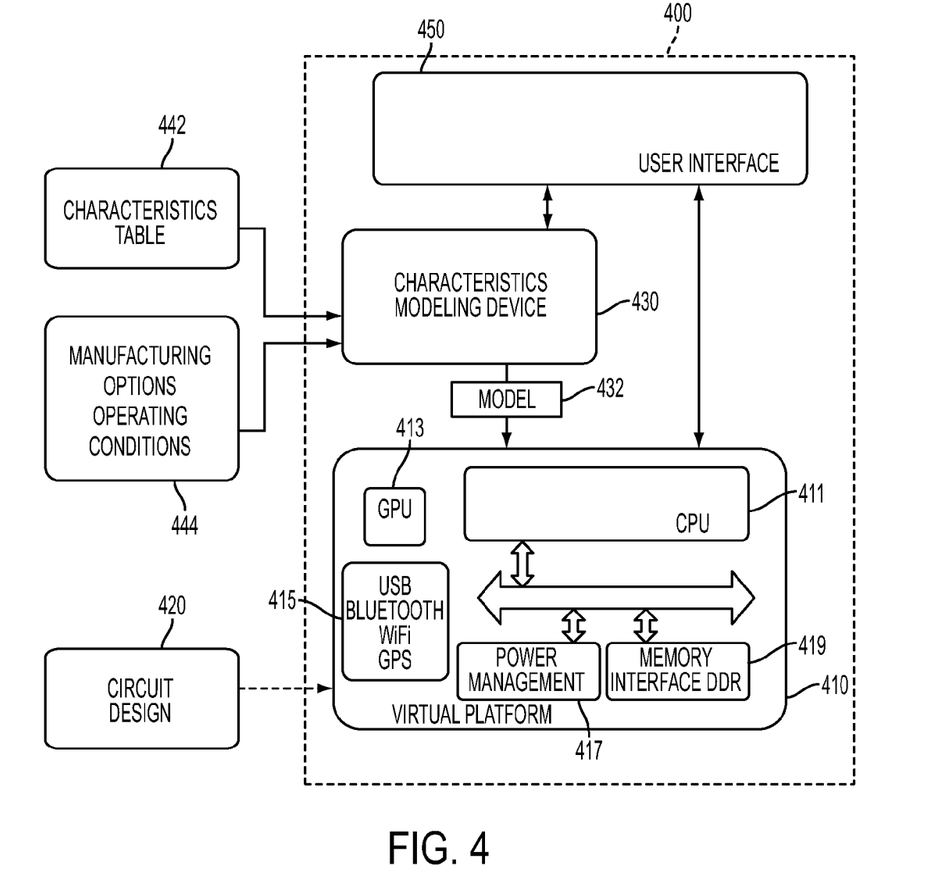
FIG. 4 is a functional block diagram of a simulation system according to an embodiment.

FIG. 4 is a functional block diagram of a simulation system 400 according to an embodiment. The simulator system 400 includes a circuit modeling device (such as a virtual platform) 410 configured to provide a system-level approximation of a circuit design 420 using a system-level model 432 for a simulation configuration 444 calculated by a system-level characteristics modeling device 430. The virtual platform 410 is implemented by a computer having a storage encoded (stored) with a computer program code to cause a processor of the computer to execute the defined functions to simulate the circuit design 420. The virtual platform 410 provides a system-level approximation of components of the circuit design, including a central computing processor (CPU) 411, graphical computer processor (GPU) 413, network or input/output interfaces 415, power management module 417, and/or memory module 419. For example, a virtual platform includes a cell phone application processor, a PC-on-a-chip SoC, a subsystem representing a router, or a real-time digital control system.

The simulator system 400 further includes the system-level characteristics modeling device 430 coupled to the virtual platform 410 and configured to generate the system-level model 432 according to a system-level characteristics table 442 (such as the system-level characteristics table generated according to the method of FIG. 2) and a simulation configuration 444 of manufacturing options and/or operating conditions. The system-level characteristics modeling device 430 is implemented by a computer having a storage encoded with a computer program code to cause a processor of the computer to execute the defined functions to generate a system-level model according to the system-level characteristics table 442 and the simulation configuration 444. In some embodiments, the system-level characteristics modeling device 430 and the virtual platform 410 are implemented using an integrated set of computer program code.

The simulator system 400 further includes a controlling interface device (such as a user interface) 450 coupled to the virtual platform and the system-level characteristic computation engine 430. The user interface 450 is operable by a user and usable to define the simulation configuration 444 for the system-level characteristics modeling device 430 and to display a simulation result from the virtual platform 410.

Figure 6:
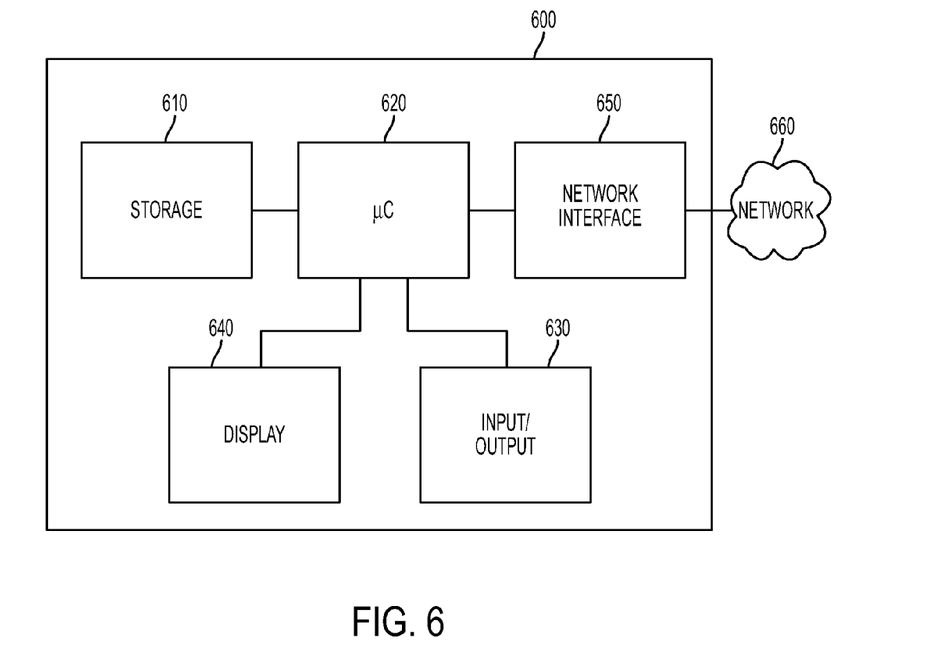
FIG. 6 is a functional block diagram of a computer system usable for implementing the method disclosed in FIG. 2 or FIG. 5, or the system disclosed in FIG. 4, according to some embodiments.

In some embodiments, the simulator system 400 is implemented by one or more computer systems similar to the computer system depicted in FIG. 6. In some embodiments, the system-level characteristic computation engine 430 and the virtual platform 410 comprise different sets of computer program codes.

Figure 5:
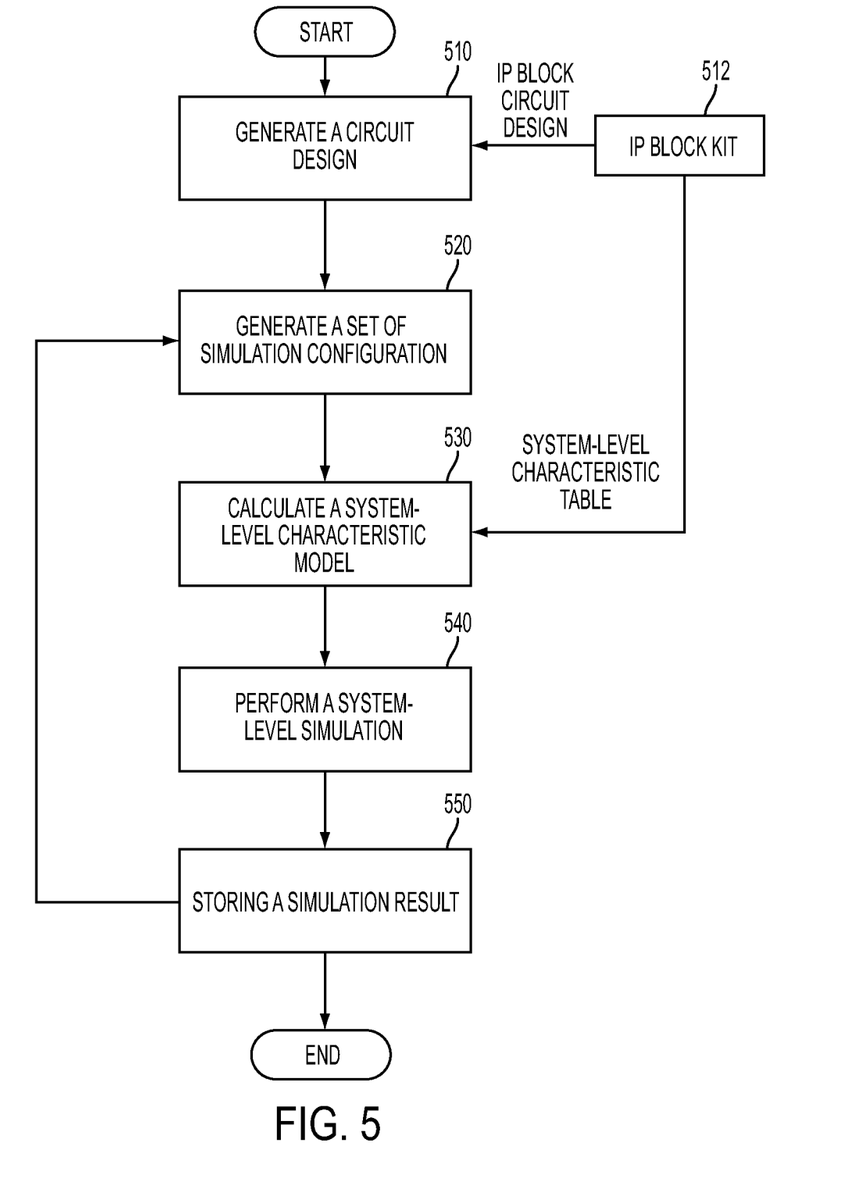
FIG. 5 is a flow chart of a method of generating an IC design using the IP block design kit according to an embodiment.

FIG. 5 is a flow chart of a method of generating an IC design by the IC designer 150 using the IP block design kit (such as the IP block design kit 140 in FIG. 1) according to an embodiment. In some embodiments, additional operations are performed before, during, and/or after the method of FIG. 5.

In operation 510, IC designer 150 generates a circuit design is generated by using at least one IP block circuit design (e.g. 142 in FIG. 1) of a IP block design kit 512 from the IP vendor 130. In at least one embodiment, the generation of the circuit design is implemented using a system-level circuit design approach. Further, in operation 520, IC designer 150 generates a set of simulation configuration of manufacturing options and/or operating conditions by operating a simulation system and/or a system-level characteristics modeling device.

In operation 530, IP designer 150 uses a system-level characteristics modeling device provided by the IC foundry 110, such as the system-level characteristics modeling device of FIG. 4, to calculate a system-level model of the IP block circuit design 142 for the set of simulation configuration according to a system-level characteristics table. The system-level model will be subsequently used to perform a simulation for the IP block circuit design 142.

In some embodiments, if the set of simulation configuration is consistent with one of the predetermined configuration sets, a system-level model corresponding to the matched one of the predetermined configuration sets is used as the system-level model for the set of simulation configuration. If none of the predetermined configuration sets has an exact match with the set of simulation configuration, one or more predetermined configuration sets that is consistent with the intended configuration regarding a first portion of the manufacturing options and/or operating conditions, i.e., the primary attributes, is selected. Then the system-level model is calculated according to system-level models of the selected one or more predetermined configuration sets. The calculation of the system-level model is performed using interpolation, extrapolation, or curve-fitting according to the values of the non-primary attributes and the system-level characteristics model of the selected one or more predetermined configuration sets.

In some embodiments, two of the predetermined configuration sets that are consistent with the set of simulation configuration regarding primary attributes are selected and relied upon to calculate the system-level model for the set of simulation configuration.

The process proceeds to operation 540, where the IC designer 150 performs a system-level simulation using the simulation system of FIG. 4 for the circuit design according to the system-level model calculated in operation 530. Subsequently, in operation 550, a simulation result is stored in a computer readable storage medium. The computer readable medium for storing the simulation result is the same or similar as the computer readable medium used to store a computer program code for causing the processor of the computer system to perform the method of FIG. 5. In some embodiments, the computer readable media for storing the simulation result is different from the computer readable media used to store a computer program code. The stored simulation result is displayable or observable through a user interface of FIG. 4 or transferable to a circuit design tool for further refinement of the circuit design. In some embodiments, IC Designer 150 refine the circuit design by cyclically performing operations 520-550.

FIG. 6 is a functional block diagram of a computer system usable for implementing the method disclosed in FIG. 3 or FIG. 6, or the system disclosed in FIG. 5, according to some embodiments.

Computer system 600 includes a computer readable storage medium 610 encoded with, i.e., storing, a computer program code, i.e., a set of executable instructions. The computer system 600 includes a processor 620 electrically coupled to the computer readable storage medium 610. The processor 620 is configured to execute the computer program code encoded in the computer readable storage medium 610 in order to cause the computer to function as a circuit analyzer for performing the characterization process for the IP Block circuit design 142 as depicted in FIG. 2 or as a simulation system that calculates a system-level model based on system-level characteristics table as depicted in FIG. 5.

In some embodiments, the processor 620 is a central processing unit (CPU), a multi-processor, a distributed processing system, and/or any suitable processing unit.

In some embodiments, the computer readable storage medium 610 is an electronic, magnetic, optical, electromagnetic, infrared, and/or a semiconductor system (or apparatus or device). For example, the computer readable storage medium 610 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 610 includes a compact disk-read only memory (CD-ROM), a compact disk-read/write (CD-R/W), and/or a digital video disc (DVD).

Further, the computer system includes an input/output interface 630 and a display 640. The input/output interface 630 is coupled to the processor 620 and allows an IC designer 150 or an IP vendor 130 to operate the computer system 600 in order to perform the methods depicted in FIG. 2 or FIG. 5. The display 640 displays the status of operation of the methods depicted in FIG. 2 or FIG. 5. in a real-time manner, and preferably provides a Graphical User Interface (GUI). The input/output interface 630 and the display 640 allow an operator to operate the computer system 600 in an interactive manner.

The computer system also includes a network interface 650 coupled to the processor 620. The network interface allows the computer system 600 to communicate with a network 660, to which one or more other computer systems are connected. The network interface includes wireless network interfaces such as BLUETOOTH, WIFI, WIMAX, GPRS, or WCDMA; or wired network interface such as ETHERNET, USB, or IEEE-1394. In some embodiments, the method of FIGS. 2 and 5 are implemented in two or more computer systems 600 of FIG. 6, and information such as an IC design, a system-level characteristics table, a system-level model, cell libraries, and/or other information are exchanged between different computer systems via the network 660.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of generating an intellectual property (IP) block design kit including an IP block circuit design and a system-level characteristics table for manufacturing an integrated circuit, the method comprising:
   generating the IP block circuit design;
   simulating the IP block circuit design based on two or more predetermined configuration sets, each of the predetermined configuration sets comprising one or more different attributes regarding manufacturing options or operating conditions;
   generating a plurality of corresponding system-level models of the IP block circuit design for the predetermined configuration sets based on the simulation of the IP block circuit design;
   generating the system-level characteristics table by arranging the predetermined configuration sets and the system-level models in compliance with a predetermined system-level characteristics table template recognizable by a system-level characteristics modeling device, the system-level characteristics modeling device being configured to calculate another system-level model of the IP block circuit design according to the system-level characteristics table; and
   generating the IP block design kit based on the IP block circuit design and the system-level characteristics table.

2. The method of claim 1, wherein the simulation of the IP block circuit design comprising:

generating an equivalent circuit configured to approximate parasitic effects of a layout according to the IP block circuit design, one of the predetermined configuration sets, and a cell library associated with the one of the predetermined configuration sets.

3. The method of claim 1, wherein the simulation of the IP block circuit design comprising:
performing a functional simulation of the IP block circuit design to define at least one power event; and
performing a power simulation of the IP block circuit design, based on the at least one power event and the predetermined configuration sets.

4. The method of claim 1, wherein the generation of the system-level models comprises selecting a predetermined number of circuit paths as an operating frequency profile model.

5. The method of claim 1, wherein the generation of the plurality of system-level models comprises converting the IP block circuit design into an equivalent NAND gate count as a die area profile model.

6. The method of claim 1, further comprising receiving the system-level characteristics table template from an IC foundry.

7. The method of claim 1, wherein the arrangement of the predetermined configuration sets and the system level models comprises arranging predetermined configuration sets and the system level models in the format of values or in the format of functions of the manufacturing options or the operating conditions corresponding to the one or more different attributes.

8. A method of generating an integrated circuit design for manufacturing an integrated circuit, the method comprising:
generating a circuit design by incorporating an intellectual property (IP) block circuit design;
generating a set of simulation configuration of manufacturing options and/or operating conditions for the circuit design;
calculating, using a processor, a system-level model of the IP block circuit design for the set of simulation configuration according to a system-level characteristics table of the IP block circuit design, the system-level characteristics table including two or more predetermined configuration sets, each of the predetermined configuration sets having a plurality of attributes regarding manufacturing options or operating conditions, and two or more system-level models corresponding to the predetermined configuration sets; and
performing a system-level simulation according to the system-level model for the set of simulation configuration.

9. The method of claim 8, wherein the calculation of the system-level model for the set of simulation configuration comprises:
using a system-level model corresponding to a matched one of the predetermined configuration sets as the system-level model for the set of simulation configuration when the set of simulation configuration is consistent with the matched one of the predetermined configuration sets.

10. The method of claim 8, wherein the calculation of the system-level model for the set of simulation configuration comprises:
selecting one or more of the predetermined configuration sets that is consistent with the set of simulation configuration regarding a first group of the manufacturing options or the operating conditions; and
calculating the system-level model for the set of simulation configuration according to one or more system-level models corresponding to the selected one or more of the predetermined configuration sets.

11. The method of claim 10, wherein the calculation of the system-level model for the set of simulation configuration according to the one or more system-level models comprises performing interpolation, extrapolation, or curve-fitting according to the one or more system-level models and the corresponding attributes regarding a second group of the manufacturing options or the operating conditions.

12. The method of claim 8, wherein the calculation of the system-level model for the set of simulation configuration comprises:
selecting two of the predetermined configuration sets that are consistent with the set of simulation configuration regarding a first group of the manufacturing options or the operating conditions; and
calculating the system-level model for the set of simulation configuration according to two system-level models corresponding to the selected two of the predetermined configuration sets.

13. The method of claim 12, wherein the calculation of the system-level model for the set of simulation configuration according to the two system-level models comprises performing interpolation, extrapolation, or curve-fitting according to the two system-level models and the corresponding attributes regarding a second group of the manufacturing options or the operating conditions.

14. A computer system comprising:
a computer readable storage medium encoded with a computer program code; and
a processor coupled to the computer readable storage medium, the processor being configured to execute the computer program code, the code being arranged to cause the processor to:
simulate an IP block circuit design based on predetermined configuration sets, each of the predetermined configuration sets having one or more different attributes regarding manufacturing options or operating conditions;
generate a plurality of system-level models of the IP block circuit design for the predetermined configuration sets based on the simulation of the IP block circuit design; and
generate the system-level characteristics table based on the predetermined configuration sets and the system-level models in compliance with a predetermined system-level characteristics table template recognizable by a system-level characteristics modeling device, the system-level characteristics modeling device being configured to calculate another system-level model of the IP block circuit design according to the system-level characteristics table.

15. The computer system of claim 14, wherein the code regarding the characterization of the IP block circuit design is further arranged to cause the processor to:
perform a functional simulation of the IP block circuit design to define at least one power event; and
perform a power simulation of the IP block circuit design, based on the at least one power event and the predetermined configuration sets.

16. The computer system of claim 14, wherein the code regarding the generation of the system-level models is further arranged to cause the processor to select a predetermined number of circuit paths as an operating frequency profile model.

17. The computer system of claim 14, wherein the code regarding the generation of the system-level models is further arranged to cause the processor to convert the IP block circuit design into an equivalent NAND gate count.

18. A computer system comprising:
- a computer readable storage medium encoded with a computer program code; and
- a processor coupled to the computer readable storage medium, the processor being configured to execute the computer program code, the code being arranged to cause the processor to:
- calculate a system-level model of an IP block circuit design for a set of simulation configuration of manufacturing options and/or operating conditions according to a system-level characteristics table of the IP block circuit design, the system-level characteristics table including predetermined configuration sets having a plurality of attributes regarding manufacturing options or operating conditions and system-level models corresponding to the predetermined configuration sets; and
- perform a system-level simulation according to the system-level model for the set of simulation configuration.

19. The computer system of claim 18, wherein the code regarding the calculation of the system-level characteristics model is further arranged to cause the processor to use a system-level model corresponding to a matched one of the predetermined configuration sets as the system-level for the set of simulation configuration when the set of simulation configuration is consistent with the matched one of the predetermined configuration sets.

20. The computer system of claim 18, wherein the code regarding the calculation of the system-level characteristics model is further arranged to cause the processor to:
- select one or more of the predetermined configuration sets that is consistent with the set of simulation configuration regarding a first group of the manufacturing options or the operating conditions; and
- calculate the system-level model for the set of simulation configuration according to one or more system-level models corresponding to the selected one or more of the predetermined configuration sets.

* * * * *